E. HIXSON.
Pruning-Knife.

No. 199,065.  Patented Jan. 8, 1878.

WITNESSES:
Jas. C. Hutchinson
J. Wm. Mister

INVENTOR.
Ezra Hixson
Edson Bros.
Attys.

UNITED STATES PATENT OFFICE.

EZRA HIXSON, OF RUSSELL, IOWA, ASSIGNOR OF ONE-HALF HIS RIGHT TO GEORGE C. BOGGS AND GEORGE W. PLOTTS, OF SAME PLACE.

IMPROVEMENT IN PRUNING-KNIVES.

Specification forming part of Letters Patent No. 199,065, dated January 8, 1878; application filed June 1, 1877.

*To all whom it may concern:*

Be it known that I, EZRA HIXSON, of Russell, in the county of Lucas and State of Iowa, have invented certain new and useful Improvements in Pruning-Knives; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
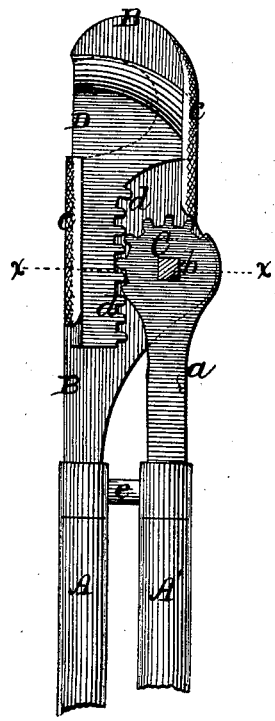
Figure 2:

Figure 1 is a side view of my improved pruning-shears, and Fig. 2 is a transverse section through the dotted line $x\ x$ of Fig. 1.

Corresponding parts in the two figures are denoted by like letters.

This invention relates to a certain improvement in pruning or other shears; and it consists of a hook having a cutting-surface, and formed with flanges or guides, between which slides, and is confined thereto, a blade having a rack, with which gears a toothed segment, journaled to said hook by a threaded axis, and having its handle provided with a separating or abutting stud or stop, substantially as hereinafter more fully set forth.

In the annexed drawing, A A' refer to two handles or rods. To the upper end of the handle A is secured, in any known way, a stationary blade or hook, B, its cutting-surface being hook-shaped, in order to enable it to take hold of and pull the branch or limb down to be cut or pruned. To the upper end of the other handle or rod, A', is secured, in any preferred manner, a bar, *a*, formed with a toothed or cogged segment, C, connected to the shank of the stationary blade or hook B by an axis, *b*, which may be headed and provided with a screw-thread, to permit of its being readily detached for the purpose of removing the cogged segment C.

D is an independent blade, the upper end of which forms its cutting-surface, and sliding upon and past the blade B, and between and under flanges or guides *c c*, preferably formed upon said blade B, the two blades jointly forming the shears. The blade D is provided with a rack or teeth, *d d*, with which gears the toothed or cogged segment C of the handle A'.

It will be seen that, by moving the handle A' away from the handle A, its cogged or toothed segment C will engage and cause the sliding toothed blade D to descend, opening the shears, and by moving the handle A' toward the handle A the blade D will be caused to ascend and move past the blade B, which movement of the blade D, in connection with the blade B, will, of course, sever the limb, &c., caught between the latter blade or hook and the ascending blade.

The cogged or toothed segment C being readily detachable, as above stated, it can be temporarily removed to permit of changing the relative position of the teeth or cogs of the segment C and blade D, in order to allow the said blade, when reduced by sharpening and wear, to be elevated or raised, to keep the shears in working order, &c.

*e* is a stud or headed screw projecting from the inner side of one of the handles, and against which the opposite handle abuts, to keep them apart when the shears are closed, and prevent the contact of the hand therewith. This screw may be also used to fasten the blade to its handle.

It will be observed that the above-described parts combine great simplicity, cheapness, strength, ease of operation, and are not liable to get out of order, in addition to short leverage, &c.

I am aware that the pinion on one of the arms and a rack upon the sliding blade are not new, *per se.*

Having thus described my invention, what I claim, and desire to secure by Letters Patent, is—

1. The pruning-shears consisting of the stationary blade or hook B, having the flanges *c c* formed in one piece therewith, the plate or blade D, having teeth or a rack, and handle having a toothed or cogged segment, C, connected to said plate or blade D by a single axis or screw-bolt, *b*, substantially as and for the purpose set forth.

2. The combination, with the blade or hook

B, the sliding serrated blade or plate D, reduced upon its rear side just above its rack or teeth, as shown, and segment C, the said reduction providing for the movement of said segment, by which it may be brought in close proximity with the heel of the knife D, and thus permit of the compact arrangement of the constituent parts, substantially as specified.

In testimony that I claim the foregoing as my own I hereunto affix my signature in presence of two witnesses.

EZRA HIXSON.

Witnesses:
F. C. SQUIRES,
T. SPRAGUE.